United States Patent [19]
Smith et al.

[11] Patent Number: 5,390,139
[45] Date of Patent: Feb. 14, 1995

[54] DEVICES, SYSTEMS AND METHODS FOR IMPLEMENTING A KANERVA MEMORY

[75] Inventors: Derek Smith, Lafayette, La.; Shivaling Mahant-Shetti, Richardson; Basavaraj Pawate, Dallas, both of Tex.; George R. Doddington, McLean, Va.; Warren L. Bean, Austin, Tex.

[73] Assignee: Texas Instruments Incorporated, Dallas, Tex.

[21] Appl. No.: 69,048

[22] Filed: May 28, 1993

[51] Int. Cl.6 ............................................. G11C 13/00
[52] U.S. Cl. .................................. 365/49; 365/230.03
[58] Field of Search ................ 365/49, 230.01, 230.03, 365/230.04, 230.05, 230.08

[56] References Cited

U.S. PATENT DOCUMENTS 5,208,782  5/1993  Sakuta et al. ................ 365/230.03
5,229,971  7/1993  Kiryu et al. ................... 365/230.03

Primary Examiner—Terrell W. Fears
Attorney, Agent, or Firm—Douglas A. Sorensen; Richard L. Donaldson; William E. Hiller

[57] ABSTRACT

A memory system 10 is provided including a processor 12 and an active memory device 14 coupled to a processor 12. Active memory 14 includes a first memory 20 for storing a plurality of possible addresses and a second memory 22 for storing an actual address received from processor 12. Circuitry 26 is provided for identifying at least one active address from ones of the possible addresses stored in first memory 20 as a function of the actual address stored in second memory 22.

20 Claims, 2 Drawing Sheets ively addressed. The address space is partitioned into a number of key addresses. A set of addresses within a Hamming distance of the key address (the Hamming distance being the number of bit positions in which two N-bit binary vectors differ) "activate" that key address allowing access to a storage element associated with that key address. The Hamming distance (or radius of capture) may vary from key address to key address. Each storage element includes a series of multibit counters or registers, each storing data as a signed integer typcially represented by 2–8 binary bits. One counter or register is provided in each element for each bit position in the data words being stored/retrieved.

DEVICES, SYSTEMS AND METHODS FOR IMPLEMENTING A KANERVA MEMORY

NOTICE (C) Copyright, *M* Texas Instruments Incorporated, 1993. A portion of the Disclosure of this patent document contains material which is subject to copyright protection. The copyright and mask work owner has no objection to facsimile reproduction by anyone of the patent document or the patent disclosure, as it appears in the U.S. Patent and Trademark Office, patent file or records, but otherwise reserves all rights in its copyright and mask work whatsoever.

CROSS-REFERENCE TO RELATED APPLICATIONS

The following coassigned patents and applications are hereby incorporated herein by reference:

U.S. patent application Ser. No. 08/068,909, entitled "APPARATUS, SYSTEMS AND METHODS FOR DISTRIBUTED PROCESSING", filed May 28, 1993;

U.S. patent application Ser. No. 08/069,308, "APPARATUS, SYSTEMS AND METHODS FOR DISTRIBUTED PROCESSING", filed May 28, 1993; and U.S. patent application Ser. No. 08/068,908, "APPARATUS, SYSTEMS AND METHODS FOR DISTRIBUTED SIGNAL PROCESSING", filed May 28, 1993.

TECHNICAL FIELD OF THE INVENTION

The present invention relates in general to digital memories and in particular to devices, systems, and methods for implementing a Kanerva memory.

BACKGROUND OF THE INVENTION

A Kanerva memory system is random access memory system which uses long addresses, typically in the range of 100 to 10000 bits, to store and retrieve information. Most importantly, Kanerva memories are associative such that storage locations do not have to be precisely addressed. The address space is partitioned into a number of key addresses. A set of addresses within a Hamming distance of the key address (the Hamming distance being the number of bit positions in which two N-bit binary vectors differ) "activate" that key address allowing access to a storage element associated with that key address. The Hamming distance (or radius of capture) may vary from key address to key address. Each storage element includes a series of multibit counters or registers, each storing data as a signed integer typcially represented by 2–8 binary bits. One counter or register is provided in each element for each bit position in the data words being stored/retrieved.

When an actual address is received by the Kanerva memory requesting access, a test is performed to determine which key address or addresses are activated. During a read operation a number of key addresses may be activated and a best-average value is determined for the data retrieved from the corresponding storage elements accessed. During a write to an accessed storage element, a logic 1 at a given bit position of a data word being written to the element increments the corresponding counter while a logic 0 at a given bit position decrements the corresponding counter.

Kanerva memory systems are useful many data processing applications requiring associative memory, such as pattern recognition and pattern classification. Thus, the need has arisen for a fast, simple and inexpensive implementations of Kanerva memories.

SUMMARY OF THE INVENTION

According to embodiments of the present invention, a memory system is provided which includes a processor and an active memory coupled to the processor. The active memory includes a first memory for storing a plurality of possible addresses and a second memory for storing an actual address received from the processor. Circuitry for identifying is provided which identifies at least one active address from the possible addresses stored in the first memory as a function of the actual address stored in the second memory.

According to further embodiments of the present invention, a memory system is provided which includes a processor and an active memory coupled to the processor. The active memory includes a data memory for storing a plurality of possible addresses and data associated with each of the addresses. A broadcast memory is also provided for storing an actual address received from the processor. The active memory includes circuitry for identifying from the addresses stored in the data memory an active address within a Hamming distance of the actual address word stored in the broadcast memory. The active memory further includes circuitry for accessing the data stored in the data memory associated with the active address and a controller. The controller is operable to control the transfer of the address words from the data memory to the circuitry for identifying and the transfer of the actual address from the broadcast memory to the circuitry for identifying.

The embodiments of the present invention are useful in many data processing applications. In particular embodiments of the present are useful in constructing fast, simple and inexpensive implementations of Kanerva memories.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The preferred embodiments of the present invention and their advantages are best understood by referring to FIGS. 1 through 4 of the drawings, like numerals being used for like and corresponding parts of the various drawings.

Figure 1:
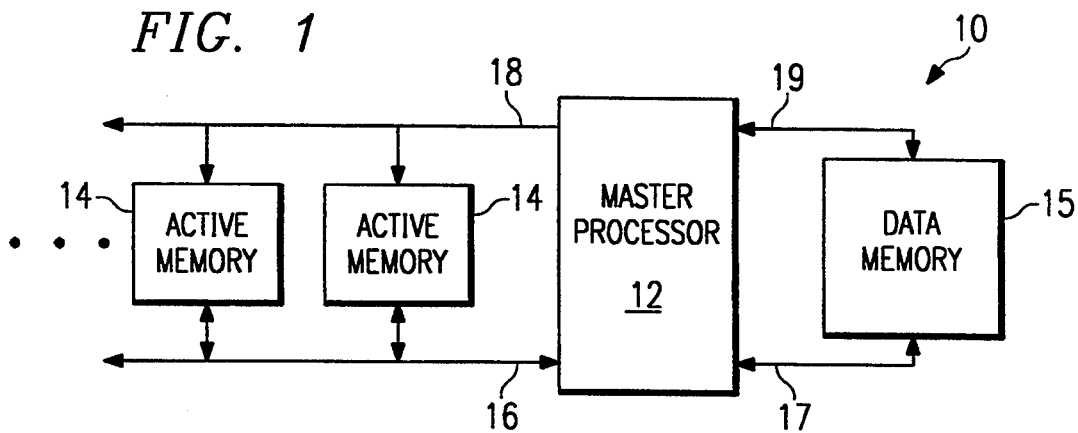
FIG. 1 is a functional block diagram of a memory system embodying concepts of the present invention.

FIG. 1 is a block diagram of a Kanerva memory system 10 embodying the concepts of the present invention. Kanerva memory system 10 includes a master processor 12, an active memory devices 14 and a system data memory 15. Master processor 12 exchanges data with active memory devices 14 via data bus 16 and with system data memory 15 via data bus 17. As discussed further below, the "data" being exchanged on bus 16 are primarily addresses to the system data memory 15. Read/write addresses are provided to active memory 14 via address bus 18. Addresses retrieved from active memories 14 are communicated to system data memory 15 via address bus 19. Preferably, each active memory 14 in system 10 has a pin configuration compatible with the pin configuration of a chosen conventional ("inactive") memory unit (for example a 28-pin pinout). In this fashion, active memories 14 and conventional inactive memories can be interchanged on a given board or other supporting structures.

In general, master processor 12 stores a number of possible addresses to data memory 15 in active memory devices 14. The possible addresses may be randomly chosen and depending on the size of the memory formed by memory devices 14 may number from 1,000 to 1,000,000 addresses. When access to locations in the system data memory 15 is required, an actual address is sent to active memory 14 by master processor 12. Active memory 14 then determines which possible addresses stored therein are active addresses by cycling through the stored addresses and identifying which ones are within the Hamming distance of the address received by system 10. The identified active addresses are then used by master processor 12 to access locations in data memory 15. During a read request, the data retrieved from the accessed locations in data memory 15 with each active address provided to master processor 12 which accumulates the data, compares it against a threshold, and provides a result corresponding to the actual address. During a write, data from processor 12 provided on data bus 18 alters the currently stored data in an accessed location by incrementing or decrementing the counters (or registers) in system data memory 15 corresponding to each bit on data bus 17.

Figure 2:
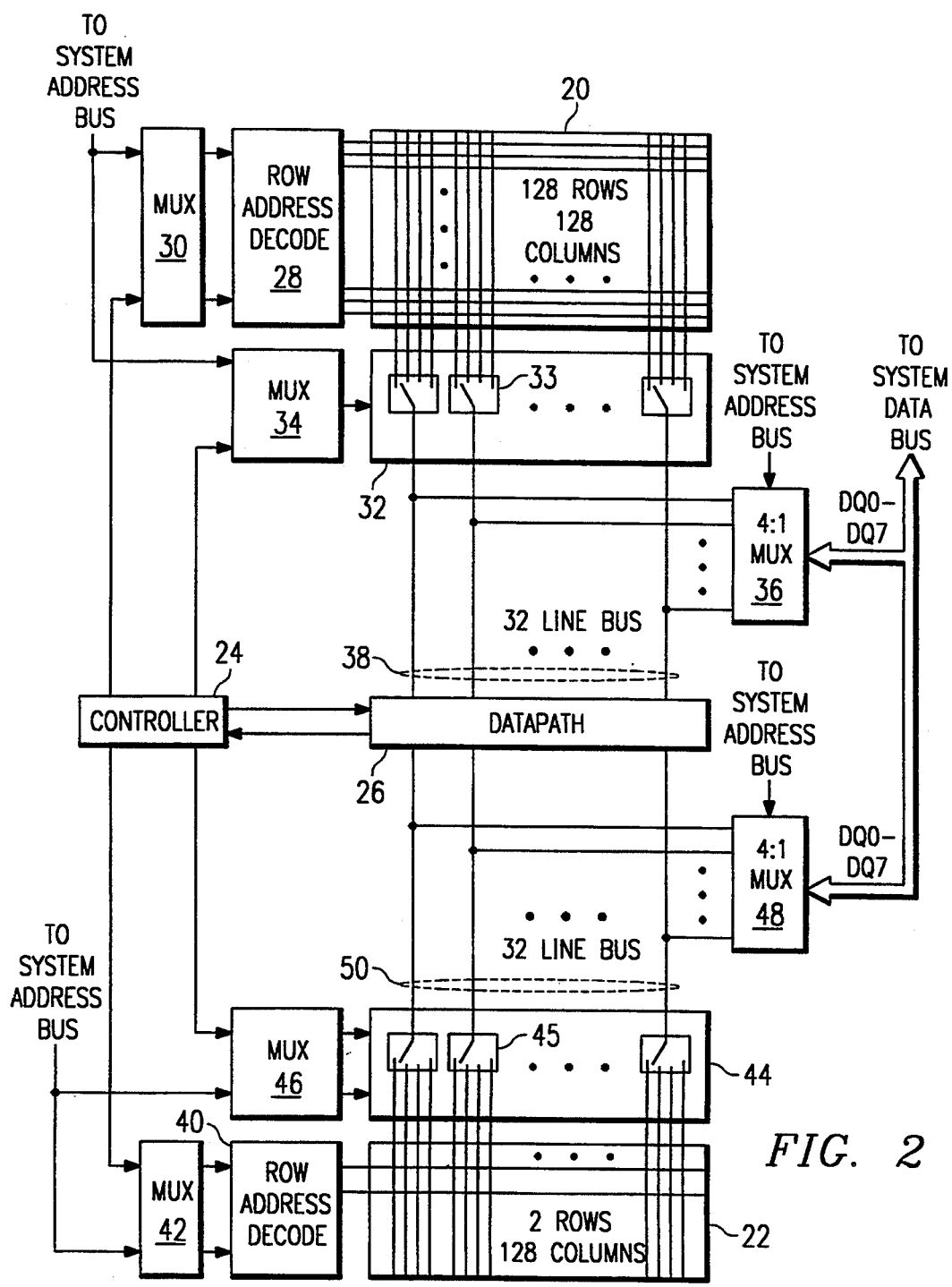
FIG. 2 is a detailed functional block diagram of the active memory depicted in FIG. 1.

FIG. 2 is a functional block diagram of an active memory 14 embodying the concepts of the present invention. Active memory 14 may be constructed as a single chip or module (a "device") which includes a data random access memory 20 (RAM), a broadcast RAM 22, a controller 24 and datapath 26. In the single chip embodiment, data RAM 20 and broadcast RAM 22 may be fabricated in a standardized configuration for a given set of devices while controller 24 and datapath 26 are customized to meet the operational requirements for a given device or subset of devices.

Data RAM 20 may be either a static random access memory (SRAM) or a dynamic random access memory array (DRAM). In FIG. 2, RAM 20 is depicted as a 2k×8 memory arranged as 128 rows and 128 columns of RAM cells. It should be noted that in addition to the configuration shown in FIG. 2, any one of a number of alternate RAM architectures may also be used, as is understood in the art. Associated with data RAM 20 is read/write circuitry for reading and writing data to and from selected cells in the array including row address circuitry 28, a row address multiplexer 30, first stage decoding (column address) circuitry 32, column address multiplexer 34 and input/output circuitry 36. Multiplexer 30 passes address bits to the row address circuitry 28 from either system address bus 18 or from the controller 24. The selection can be made in response to either a discrete signal or in response to the value of the address itself. Similarly, multiplexer 34 passes address bits from either the address bus 18 or from controller 24. Multiplexers 30 and 34 along with input/output circuitry 36 allow for the transfer of bits of data between the cells of data RAM either CPU 12 using data bus 16 and address bus 18 or datapath 26 using internal bus 38.

In the embodiment of FIG. 2, first stage decoder 32 multiplexes each set of four adjacent bitlines using multiplexers 33 to form an internal bus 38 which is 32 bits wide. I/O circuitry 36 includes a four to one multiplexer which selects, in response from address bits from address bus 18, one of four sets of eight adjacent bits on 32-bit internal bus 38 for communication with the system data bus 16. It should be noted that in alternate embodiments the configuration of first stage decoder 32 and input/output circuitry 36 may vary depending on such factors as the width of internal bus 38, the configuration of data RAM 20 and the number of lines (bits) communicating with system data bus 16.

Broadcast RAM 22 may also be either static or dynamic and is similarly associated with read/write circuitry for writing and reading data into and out of its memory cell array, including row address circuitry 40, row address multiplexer 42, first stage (column) decoding circuitry 44, multiplexer 46 and input/output circuitry 48. In FIG. 2, broadcast RAM 22 is organized as 2 rows and 128 columns, although alternate row/column organizations may be used in other embodiments. The read/write circuitry associated with broadcast RAM 22 operates similar to the read/write circuitry associated with data RAM 20. First stage decoder circuitry 44 includes multiplexers 45 for performing 4:1 multiplexing on each four adjacent columns of the 128 columns memory cells in broadcast RAM 22 with the selected 32 bits coupled to datapath 26 via a second internal bus 50. Multiplexers 42 and 46 selectively pass address bits from either system address bus 18 or from controller 24. Thus, multiplexers 42 and 46 along with input/output circuitry 48 allow for the transfer of data between the cells of broadcast RAM 22 from either CPU 12 via or from controller 24 through datapath 26.

As with the corresponding read/write circuitry associated with data RAM 20, the specific configurations of row address circuitry 40, multiplexers 42 and 46, first stage decode circuitry 44, and input/output circuitry 48 will vary based on such factors as the numbers of rows and columns in the cell array of broadcast RAM 22, the width of internal bus 50, the number of bits being received from the system address bus 18 and the number of bits (lines) communicating with the system data bus 14. Further, the coupling of data bus 16 with input/output circuitry 36 associated with data RAM 20 and input/output circuitry 48 associated with broadcast RAM 22 is preferably made through a single set of pins (D0-D7) to provide compatibility with conventional memory pinouts. Similarly, the coupling of the read/write circuitry associated with both data RAM 20 and broadcast RAM 22 may be made through a single set of pins (also not shown). Since active memories 14 are part of the system memory, it is preferable that memories 14 take on the characteristics of memory chips. In other words, Memories 14 should be efficient like memory chips, small in size and relying on a minimum number of data and address pins which are compatible with the pin configurations of conventional ("inactive") memory chips.

Datapath 26 may be implemented in random logic, in programmable gate array circuitry, or in programmable logic array circuitry, as required to customize the chip or unit to perform desired computational functions. Further, both controller 24 and datapath 26 may together be implemented in digital signal processing circuitry, such as that found in the Texas Instruments TI-320 family of digital signal processors.

In the preferred embodiment of system 10, each Broadcast RAM 22 is placed at the highest address space available for the corresponding number of address bits received by active memories 14 from system address bus This allows each broadcast RAM 22 to be written to or read from without a chip select signal. Further, all the broadcast RAMs 22 of the active memories 14 in system 10 can be accessed simultaneously.

In the illustrated Kanerva memory embodiment, master processor loads data RAM 20 with a number of randomly chosen addresses using data bus 16 and address bus 180 These addresses may be in the range of 100 to 10,000 bits in length. In the 32-bit architecture shown, the addresses are cycled in as 32-bit words via internal bus 38 and multiplexers 33. When a request for access to system data memory 15 is required, an actual address 10 is written into broadcast RAM 22 by master processor 12. Under direction of control instructions received from processor 12 held in broadcast RAM 22, controller 24 cyclically retrieves the addresses held in data RAM 20. As the addresses are retrieved from data RAM 20, a determination is made in datapath 26 as to which addresses are within the Hamming distance of the actual address held in broadcast RAM 22 (i.e. active). The identified active addresses can then be retrieved from data RAM 22 by master processor 12 for accessing elements in system memory 15. Processor 12 can either poll active memories 14 and periodically retrieve active addresses or active memories 14 can interrupt processor 12.

Figure 3:
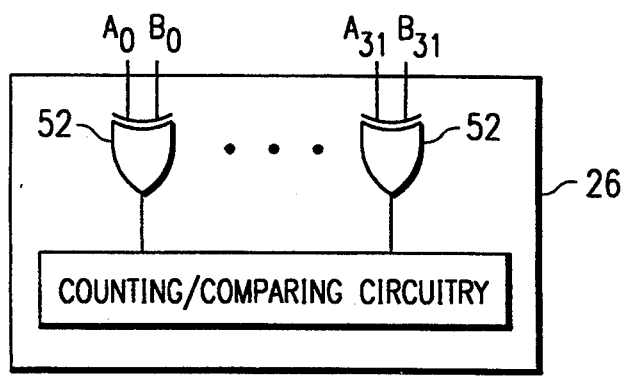
FIG. 3 is a schematic diagram of part of the circuitry implemented in the datapath depicted in FIG. 2.

FIG. 3 illustrates one possible embodiment of the circuitry in datapath 26 which determines which addresses from data RAM 20 are active addresses. The Hamming distance in this embodiment is determined using a plurality of exclusive-OR gates 52 and counting/comparing. For an active memory device 14 having 32-bit internal buses 38 and 50, 32 exclusive-OR gates 52 are used. A pair of corresponding lines $A_i$ and $B_i$ from internal bus 38 and internal bus 50 respectively are received at the inputs of each gate 52. In other words, the first line from internal bus 38 ($A_1$) is gated with the first line from internal bus 50 ($B_1$), and so on. The number of logic 1's output from gates 52 for each address retrieved from data RAM 20 are counted up and compared against a threshold by counting/comparing circuitry 54 to determine if the address from RAM 20 is within the Hamming distance of the actual address.

Figure 4:
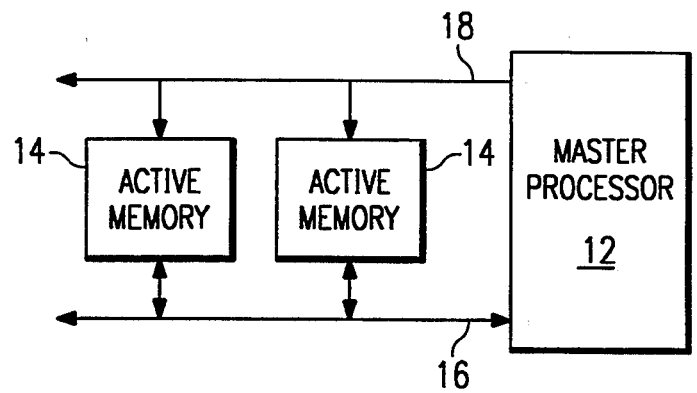
FIG. 4 is functional block diagram of a second memory system embodying concepts of the present invention.

FIG. 4 depicts an alternate embodiment of Kanerva memory 10. In this embodiment, active memories 14 also act as the system data memory. Each possible address is stored in data RAM along with associated data. When an identification of an active address occurs, the associated data is simply retrieved from active memory 14 by master processor 12. As controller 24 cycles through the addresses in data RAM 20 for a given read request and a number of active address are consequently activated, multiple words of associated data are made available. The associated data from each active address is then accumulated either in datapath 26 or by processor 12.

For performing writes using active addresses in the embodiment of FIG. 4, datapath 26 includes incrementing/decrementing capability. During a write to an active address, the data associated with that active address is read, incremented as discussed above, and the new data written back to the same locations in data RAM 20.

Although the present invention and its advantages have been described in detail, it should be understood that various changes, substitutions and alterations can be made herein without departing from the spirit and scope of the invention as defined by the appended claims.

What is claimed is:

1. A memory system comprising:
   a processor; and
   an active memory coupled to said processor comprising:
      first memory for storing a plurality of possible addresses, said plurality of possible addresses being stored in said first memory by said processor;
      second memory for storing an actual address received from said processor;
      circuitry for selecting at least one address from said plurality of possible addresses stored in said first memory as a function of a said actual address stored in said second memory.

2. The memory system of claim 1 wherein said active memory includes circuitry for presenting said selected address to said processor, said processor operable to address an associated system memory with said selected address.

3. The memory system of claim 1 and further comprising control circuitry for controlling the transfer of said ones of said possible addresses form said first memory to said circuitry for selecting and said actual address from said second memory to said circuitry for selecting.

4. The memory system of claim 1 wherein said circuitry for selecting is operable to select said selected address by identifying at least one of said plurality of possible addresses within a Hamming distance of said actual address 5. The memory system of claim 3 wherein said control circuitry comprises;
   first memory read/write circuitry for transferring said ones of said plurality of possible addresses from said first memory to said circuitry for selecting;
   second memory read/write circuitry for transferring said actual address from said second memory to said circuitry for selecting; and
   a controller coupled to said first and second read/write circuitry for controlling the sequential transfer of said ones of said plurality of possible addresses to said circuitry for selecting and the transfer of said actual address to said circuitry for selecting.

6. The memory system of claim 5 wherein said controller operates in accordance with control instructions stored in said second memory.

7. The memory system of claim 5 and further comprising first input/output circuitry coupled to said first read/write circuitry for selectively transferring said plurality of possible addresses from said processor to said first memory and second input/output circuitry coupled to said second read/write for selectively transferring said actual address from said processor to said second memory.

8. The memory system of claim 1 wherein said active memory is fabricated as a single device; said single device having a pin configuration compatible with a pin configuration of a selected inactive memory device.

9. A Kanerva memory system comprising:
a processor;
a system data memory having a plurality of data storage elements each accessible by an active address received from said processor; and
an active memory constructed as a single device comprising:
a data memory for storing plurality of address words transferred from said processor;
data memory control circuitry for selectively transferring said address words between said data memory and a first internal bus;
a broadcast memory including for storing control words and an actual address word transferred from said processor;
broadcast memory control circuitry for selectively transferring said control words and said actual address word between said broadcast memory and a second internal bus;
a datapath operable to select from ones of said address words stored in said data memory at least one said active address within a Hamming distance of said actual address word stored in said broadcast memory;
circuitry for coupling said at least one active address word to said processor; and
a controller operable in response to ones of said control words retrieved from said broadcast memory to control the sequential transfer of said address words from said data memory to said datapath via said first bus and the transfer of said actual address to datapath via said second bus.

10. The Kanerva memory system of claim 9 and further comprising data memory input/output circuitry for controlling the transfer of said address words from said processor to said data memory via said first internal bus.

11. The Kanerva memory system of claim 9 and further comprising broadcast memory input/output circuitry for controlling the transfer of said actual address word from said processor to said broadcast memory via said second internal bus.

12. The Kanerva memory of claim 10 wherein said circuitry for coupling includes said data memory input/output circuitry.

13. The Kanerva memory of claim 11 wherein said circuitry for coupling includes said broadcast memory input/output circuitry.

14. A memory system comprising:
a processor; and
an active memory coupled to said processor comprising:
a data memory for storing a plurality of possible addresses and data associated with each said address;
a broadcast memory for storing an actual address received from said processor;
circuitry for identifying from said addresses stored in said data memory an active address within a Hamming distance of said actual address word stored in said broadcast memory;
circuitry for accessing said data stored in said data memory associated with said active address; and
a controller operable to control the transfer of said address words from said data memory to said circuitry for identifying and the transfer of said actual address from said broadcast memory to said circuitry for identifying.

15. The memory system of claim 14 and further comprising circuitry for retrieving from said data memory said data associated with said active address.

16. The memory system of claim 14 and further comprising circuitry for modifying during a write said data associated with said active address in accordance with a data word received from said processor.

17. The memory system of claim 16 wherein said circuitry from modifying during a write increments at least one bit in data associated with said active address in accordance with a corresponding logic 1 received from said processor and decrements said bit in accordance with a corresponding logic 0 received from said processor.

18. The memory system of claim 17 wherein said circuitry for modifying during a write retrieve retrieves said bit of said data associated with active address, increments or decrements said at least one bit, and writes a modified said bit into said data memory.

19. A method of implementing a kanerva memory comprising the steps of:
storing a plurality of possible addresses in a first set of storage locations in an active memory device;
storing an actual address in a second set of storage locations in the active memory device;
selecting at least one of said plurality of possible addresses stored in the first set of locations as a funciton of the actual address stored in the second set of storage locations using circuitry on the active memory device; and
addressing a system data storage memory using said selected at least one of said plurality of possible addresses on the active memory device.

20. The method of claim 19 wherein said step of selecting at least one of said plurality of addresses comprises the step of selecting ones of said possible addresses which are within a Hamming distance of the actual address.

* * * * *